US012617232B2

(12) United States Patent
Baudu et al.

(10) Patent No.: US 12,617,232 B2
(45) Date of Patent: May 5, 2026

(54) MOTOR VEHICLE WHEEL ASSEMBLY

(71) Applicant: NTN EUROPE, Annecy (FR)

(72) Inventors: Alexandre Baudu, Annecy (FR);
Vincent Pourroy-Solari, Thônes (FR)

(73) Assignee: NTN EUROPE, Annecy (FR)

( * ) Notice: Subject to any disclaimer, the term of this
patent is extended or adjusted under 35
U.S.C. 154(b) by 195 days.

(21) Appl. No.: 18/416,942

(22) Filed: Jan. 19, 2024

(65) Prior Publication Data

US 2024/0255028 A1 Aug. 1, 2024

(30) Foreign Application Priority Data

Jan. 26, 2023 (FR) ........................................ 2300717

(51) Int. Cl.
B60B 27/00 (2006.01)
F16C 19/18 (2006.01)
F16C 33/41 (2006.01)

(52) U.S. Cl.
CPC ........ B60B 27/0036 (2013.01); F16C 19/186
(2013.01); F16C 33/416 (2013.01); **F16C
2326/02** (2013.01)

(58) Field of Classification Search
CPC .. F16C 19/186; F16C 33/416; F16C 2326/02;
B60B 27/0036
See application file for complete search history.

(56) References Cited

U.S. PATENT DOCUMENTS

| | | | | |
|---|---|---|---|---|
| 2008/0310784 A1* | 12/2008 | Ohtsuki | ................ | F16C 19/186 |
| | | | | 384/544 |
| 2009/0206649 A1* | 8/2009 | Niebling | ................ | B60B 27/00 |
| | | | | 301/110.6 |
| 2023/0063439 A1 | 3/2023 | Baudu et al. | | |
| 2023/0148290 A1* | 5/2023 | Baudu | ................... | F16C 19/505 |
| | | | | 384/513 |

FOREIGN PATENT DOCUMENTS

| | | | |
|---|---|---|---|
| FR | 3052104 A1 | 12/2017 | |
| WO | 2021/148675 A1 | 7/2021 | |

* cited by examiner

*Primary Examiner* — Alan B Waits

(74) *Attorney, Agent, or Firm* — Chiesa Shahinian &
Giantomasi PC

(57) ABSTRACT

A motor vehicle drive wheel assembly includes a fixed
subassembly that includes two outer raceways; a rotating
subassembly that includes a wheel hub, two inner raceways
and two rows of rolling bodies that are arranged in two pitch
planes PP1 and PP2. One of the inner raceways is formed on
a rolling bearing ring bearing against a shoulder of the wheel
hub along a bearing interface having an outer circumference
of large diameter.

19 Claims, 3 Drawing Sheets

1

MOTOR VEHICLE WHEEL ASSEMBLY

CROSS-REFERENCE TO RELATED APPLICATIONS

This application claims the benefit of priority under 35 U.S.C. 119 to French Patent Application No. 2300717, filed Jan. 26, 2023; the disclosure of which is incorporated herein by reference in its entirety.

TECHNICAL FIELD

The invention relates to a motor vehicle wheel assembly.

BACKGROUND

A motor vehicle drive wheel assembly, once mounted on the vehicle, generally comprises a fixed subassembly intended to be secured to a suspension element of the vehicle and comprising a first outer raceway and a second outer raceway defining an axis of rotation; a rotating subassembly, capable of rotating relative to the fixed member about the axis of rotation, and comprising a wheel hub, a transmission bowl, a first inner raceway located opposite the first outer raceway, a second inner raceway located opposite the second outer raceway; and rolling bodies, forming a first row of rolling bodies between the first outer raceway and the first inner raceway and a second row of rolling bodies between the second outer raceway and the second inner raceway. The wheel hub has an attachment interface for a wheel rim and a brake disc. The assembly therefore typically has a stack of technical functions, arranged along the axis of rotation from the inside to the outside of the vehicle: transmission of torque, attachment to the suspension of the vehicle, guidance in rotation, braking and rolling, which requires a large size in the axial direction, that is to say, transverse in the coordinate system of the vehicle.

It has been proposed in document FR 3,052,104 to shrink an inner rolling bearing ring for the second inner raceway onto the transmission bowl, which makes it possible to reduce the axial size for a given distance between the two rows of rolling bodies, while increasing the pitch diameter of the row of rolling bodies located on the inside of the vehicle. Insofar as the payload and the camber stiffness are increasing functions of the distance between the two rows of rolling bodies and of the pitch diameter of the rows of rolling bodies, this architecture provides a solution for reconciling reduced axial bulk and good performance in terms of payload and camber stiffness.

Electric and hybrid vehicle powertrains often turn out to be bulkier than combustion engine powertrains in the width direction of the vehicle at the drive wheels, which leads to shortening of the transverse drive shafts. This shortening is undesirable because it leads to greater angles in the transmission joints. In this context, any measure making it possible to increase the space available for the transverse transmission shafts, even slightly, is desirable. There is therefore an increased need for compactness of drive wheel assemblies in the axial direction, which does not come at the expense of performance, in particular in terms of payload and rigidity.

To this end, document WO 2021/148675 proposes a motor vehicle drive wheel assembly which combines axial compactness, high payload and good camber stiffness, and comprises a fixed subassembly comprising two coaxial annular outer raceways, a rotating subassembly comprising a wheel hub on which is formed an inner raceway, a transmission bowl, and at least one inner rolling bearing ring on which is formed a second inner raceway. Rolling bodies complete the assembly and form two rows of rolling bodies separated from each other, rolling on the inner and outer raceways to rotationally guide the rotating subassembly relative to the fixed subassembly. The inner ring is shrink-fitted on the wheel hub and clamped axially bearing against a shoulder formed on the wheel hub and a shoulder formed on the transmission bowl. The bearing shoulder of the inner ring on the wheel hub is positioned in the direct vicinity of the bottom of the inner raceway formed on the wheel hub. This positioning, which contributes to the axial compactness, requires a relatively small axial contact surface between the bearing shoulder of the inner ring and the wheel hub. The tension instituted when assembling the transmission bowl, the wheel hub and the inner ring causes a high contact pressure to the interface, which increases the risks of contact corrosion and/or abrasion. This results in a risk, in use, of exposing the inner raceway formed on the wheel hub to the metal particles generated at the interface between the shoulder and the inner ring, a risk which is even greater when the interface between the inner rolling bearing ring and the shoulder of the wheel hub emerges directly at the inner raceway formed on the wheel hub. This assembly can therefore in certain cases of use be subject to damage likely to limit its lifetime.

SUMMARY

The invention aims to propose a motor vehicle drive wheel assembly architecture, which combines axial compactness, high payload and good camber stiffness, while limiting the risks of pollution of one of the bearings by the corrosion of contact and/or abrasion.

To do this, according to a first aspect of the invention, a motor vehicle drive wheel assembly is proposed, comprising:

a fixed subassembly comprising a first annular outer raceway and a second annular outer raceway centered on a common axis of rotation;

a rotating subassembly, capable of rotating relative to the fixed subassembly about the axis of rotation, and comprising a wheel hub comprising a flange provided with an interface for attaching a wheel rim or a brake disc, the attachment flange forming a mounting face of the wheel rim or of the brake disc axially facing in a direction of disassembly of the wheel rim or of the brake disc, the direction of disassembly being parallel to the axis of rotation, a transmission bowl, and at least one inner rolling bearing ring, the inner rolling bearing ring being shrink-fitted onto a shrink-fit surface of the wheel hub, the inner rolling bearing ring having a contact face facing axially in the opposite direction to the dismounting direction, bearing against the transmission bowl at an annular contact interface, the inner rolling bearing ring having an end face facing axially in the dismounting direction, bearing against a shoulder of the wheel hub along a bearing interface having an outer circumference with a diameter DCE, the rotating subassembly further comprising a first inner raceway located opposite the first outer raceway and a second inner raceway located opposite the second outer raceway and formed on the inner rolling bearing ring; and balls, forming a first row of balls having a ball diameter DB1 and capable of rolling on the first outer raceway and the first inner raceway and a second row of balls having a ball diameter DB2 and capable of rolling on the second outer raceway and the second inner raceway, the centers of the balls of the first row of balls being located on a pitch circle of diameter DP1 located in a first pitch plane, the centers of the balls of the second row of balls being located on a pitch circle of diameter DP2 located in a second pitch plane, the first pitch plane being located at a non-zero distance L from the second pitch plane in the dismounting direction, the end face being located axially between the first pitch plane and the second pitch plane.

According to the invention, the end face of the inner rolling bearing ring is located at a distance from the first pitch plane greater than half of the ball diameter DB1 of the balls of the first row of balls. In addition, the following inequality is satisfied:

$$DP1 - \frac{8}{10}DB1 < DCE$$

Preferably:

$$DP1 - \frac{6}{10} \cdot DB1 * < DCE$$

Here, the diameter DCE is the largest diameter observed at the effective contact between the shoulder of the wheel hub and the inner rolling bearing ring, measured in a plane perpendicular to the axis of rotation.

According to the invention, it is proposed to position the interface between the inner rolling bearing ring and the shoulder of the wheel hub at an axial distance from the first inner raceway and to raise the shoulder relative to the bottom of the first inner raceway, so as to limit the pollution induced at the first row of balls and the first inner and outer raceways by possible contact corrosion.

In practice, the pitch diameter DP2 of the second row of balls is greater than the pitch diameter DP1 of the first row of balls. Preferably, $$DP1 + DB1 \leq DP2 - DB2$$

It is then possible to provide for the bearing interface between the inner rolling bearing ring and the shoulder of the wheel hub to be located radially inside the second row of balls. Thus, according to one embodiment:

$$DCE < DP2 - 2 \cdot * - DB2$$

Preferably:

$$DCE < DP1$$

According to one embodiment, one or more of the following sizing setpoints are satisfied:

the end face of the inner rolling bearing ring is closer to the second pitch plane than the first pitch plane; and/or the end face of the inner rolling bearing ring is located at a distance from the second pitch plane less than half of the ball diameter DB2 of the balls of the second row of balls.

To allow significant axial compactness, the two pitch planes are close to each other. Preferably, one or more of the following inequalities are observed:

$$L \geq \frac{DP2 - DP1}{2}$$

$$L \leq \frac{7}{5} \times * \frac{DB1 + DB2}{2}$$

$$\sqrt{4 * L^2 + (DP2 - DP1)^2} - (DB1 + DB2) \geq \frac{2}{3} \times * DB1$$

In order to retain sufficient stiffness to the inner rolling bearing ring, the following is preferably provided:

$$\frac{DB1 + DB2}{2} \leq L$$

The positioning of the contact interface of the inner rolling bearing ring with the transmission bowl relative to the bearing interface of the inner rolling bearing ring with the shoulder of the wheel hub and relative to the inner raceways is chosen so as to make the stresses in the inner rolling bearing ring uniform. To this end, one or more of the following arrangements can be provided:

the annular contact interface between the inner rolling bearing ring and the transmission bowl is located at least partially, and preferably entirely, on one side of the second pitch plane opposite the first pitch plane; and/or in orthogonal projection on the axis of rotation, at least part of the annular contact interface between the inner rolling bearing ring and the transmission bowl is positioned at a distance from the bearing interface between the inner rolling bearing ring and the shoulder, which is less than the ball diameter DB2 of the balls of the second row of balls; and/or in orthogonal projection on the axis of rotation, at least part of the annular contact interface between the inner rolling bearing ring and the transmission bowl is positioned at a distance from the bearing interface between the inner rolling bearing ring and the shoulder, which is greater than the ball diameter DB2 of the balls of the second row of balls; and/or at least part of the annular contact interface between the inner rolling bearing ring and the transmission bowl is located a distance from the second pitch plane greater than half of the ball diameter DB2 of the balls of the second row of balls; and/or in orthogonal projection on the first pitch plane, at least part of the annular contact interface between the inner rolling bearing ring and the transmission bowl is superimposed with at least part of the bearing interface between the end face of the inner rolling bearing ring and the shoulder; and/or in orthogonal projection on the first pitch plane, at least part of the annular contact interface between the inner rolling bearing ring and the transmission bowl is located between the second inner raceway and the outer circumference of the bearing interface between the end face of the inner rolling bearing ring and the shoulder; and/or in orthogonal projection on the first pitch plane, the annular contact interface between the inner rolling bearing ring and the transmission bowl and the second inner raceway are separate.

in orthogonal projection on the first pitch plane, the annular contact interface between the inner rolling bearing ring and the transmission bowl and the second inner raceway are at a distance from each other greater than half of the ball diameter DB2.

According to one embodiment, the transmission bowl comprises a splined end portion mounted free, fitted or shrunk in a splined tubular portion of the wheel hub, forming a splined contact interface, the rotating subassembly preferably comprising at least an axial holding element attached to the transmission bowl and bearing directly or indirectly against an abutment surface of the wheel hub turned axially in the direction of disassembly. Preferably, the splined contact interface allows non-destructive disassembly of the wheel hub. The axial holding element may in particular consist of a head of a screw screwed into a threaded hole formed in the transmission bowl parallel to the axis of rotation, or of a nut screwed onto a threaded portion formed on the transmission bowl. It can also be a cold deformation of one end of the transmission bowl or of the wheel hub, ensuring axial interference between the two parts. More generally, the end portion of the transmission bowl may have any cylindrical shape with a non-circular base mounted free, fitted or shrunk in a tubular portion of complementary shape of the wheel hub, forming a contact interface with a non-circular section, the rotating subassembly preferably comprising at least one axial holding element attached to the transmission bowl and bearing directly or indirectly against an abutment surface of the wheel hub turned axially in the direction of disassembly. Preferably, part of the splined tubular portion of the wheel hub is surrounded by at least part of the first inner raceway. Preferably, part of the splined tubular portion of the wheel hub is surrounded by the attachment flange.

According to one embodiment, the transmission bowl has a cylindrical bearing surface snug fitted into a cylindrical bore of the wheel hub, and located at least partially between the first pitch plane and the second pitch plane, and preferably having an intersection with a plane perpendicular to the axis of rotation and tangent to the shoulder. The fitted assembly can be used to absorb some of the radial forces transmitted at the shrink-fitting between the inner rolling bearing ring and the wheel hub.

The shrink-fit surface of the wheel hub is intended to absorb the radial forces exerted on the rolling bearing ring. Preferably:

the shrink-fit surface of the wheel hub extends at least partially between the first pitch plane and the second pitch plane; and/or the shrink-fit surface of the wheel hub extends partially from one side of the second pitch plane opposite the first pitch plane; and/or the shrink-fit surface of the wheel hub has a diameter DF such that:

$$DF < DP1 - \frac{10}{14} \cdot * DB1; \text{ and/or}$$

the shrink-fit surface of the wheel hub has a diameter DF such that:

$$DP1 - \frac{6}{5}DB1 < DF$$

The lower bound of the proposed diameter DF above reflects the desire to have a large shrink-fit diameter, which is favorable in terms of axial compactness.

According to one embodiment, the bearing interface between the bearing face and the shoulder is flat. According to another embodiment, the annular contact interface is flared, preferably frustoconical.

Preferably, the hub is a solid one-piece part, preferably metallic or bi-material, for example a steel/aluminum or steel/composite material combination. Alternatively, the wheel hub comprises at least one solid one-piece part forming the flange and the shrink-fit surface, and an additional inner rolling bearing ring shrink-fitted onto the solid part, which forms the first inner raceway and the shoulder.

In practice, the first inner raceway is enveloping in the axial direction, in the sense that it has a raceway bottom, located in an intermediate axial position between the axial ends of the raceway.

Preferably, DB1>DB2. In the envisaged configuration, the reduction in the diameter of the balls of the second row makes it possible to reduce the outside diameter of the fixed subassembly, though without increasing the bending stresses on the rolling bearing ring, and without loss of capacity, since in practice, the pitch diameter DP1 of the first row of balls is smaller than the pitch diameter DP2 of the second row of balls, so that the number of balls of the second row is greater than the number of balls of the first row. In practice, the service life of the assembly is mainly determined by the first row of balls.

In practice, the shoulder may constitute an obstacle to the axial insertion of closed annular elements of smaller diameter, such as seals or bearing cages. According to one embodiment, the first row of balls is therefore guided in rotation by a cage constituting an elastically deformable open ring, which allows the bearing cage to be mounted by moving the cage away from the shoulder. Alternatively, a bearing cage with an internal diameter greater than the diameter DCE can be provided, which can then be opened or closed.

The rolling bearing ring is preferably a solid metal part, made for example from steel.

In practice, the drive wheel assembly further comprises a transmission nut and rolling transmission bodies, the rolling transmission bodies being guided by rolling tracks formed in a cavity of the transmission bowl and on the transmission nut. The rolling bodies transmission and the transmission bowl form a transmission joint.

According to one embodiment, the wheel hub further comprises a centering bearing for centering the brake disc or the wheel rim, turned radially opposite the axis of rotation and which projects axially with respect to the mounting face in the direction of dismounting. The centering bearing may for example be cylindrical, or comprise two cylindrical portions of different diameters, the portion closest to the mounting face preferably having a larger diameter than the farthest portion, and having the function of centering the brake disc. Other profiles of the centering bearing can be considered. The centering bearing can also be discontinuous and can comprise annular grooves or grooves parallel to the axis of rotation.

The mounting face of the flange may be flat or comprise striations, splines or grooves, for example radial, annular or spiral and/or orifices for mounting, streamlining, or drainage.

Where appropriate, the rotating subassembly further comprises a brake disc bearing on the mounting face, a wheel rim bearing on the brake disc and elements for attaching the wheel rim and the brake disc to the attachment flange.

According to one embodiment, the balls of the first row of balls have contact points with the first inner raceway and the first outer raceway, which are located on a first contact cone having a first vertex located relative to the first row of balls, opposite the second row of balls, and the balls of the second row of balls have contact points with the second inner raceway and the second outer raceway, which are located on a second contact cone having a second vertex located with respect to the second row of balls, opposite the first row of balls.

In practice, the fixed subassembly may comprise an attachment clamp extending radially with respect to the first outer raceway and to the second outer raceway. The attachment clamp is intended to attach the fixed subassembly to a suspension member of the vehicle. To this end, the attachment clamp is preferably provided with an attachment interface, which may comprise bores for attaching elements to the suspension member.

The outer raceways are preferably enveloping in the axial direction, in the sense that they each have a raceway bottom, located in an intermediate axial position between the axial ends of the raceway.

According to one embodiment, the fixed subassembly comprises a one-piece solid metal outer ring forming the first outer raceway and the second outer raceway, and preferably also forming the attachment clamp. Alternatively, provision can be made for one and/or the other of the outer raceways to be made in a rolling bearing ring shrunk in a sleeve forming the attachment clamp.

Preferably, the transmission bowl is a solid one-piece metal part.

The invention also relates to a method for mounting the assembly described above, according to which, before shrink-fitting the inner rolling bearing ring on the wheel hub, a bearing cage is positioned constituting an open, elastically deformable ring, is positioned facing the first inner raceway by expanding the bearing cage when passing the shoulder of the movable subassembly, and the balls of the first row of balls are positioned in cells of the bearing cage, either before positioning the bearing cage, or after positioning the bearing cage.

BRIEF DESCRIPTION OF THE DRAWINGS

Other features and advantages of the invention will emerge on reading the following disclosure, with reference to the appended figures.

For greater clarity, identical or similar elements are identified by identical reference signs in all of the Figures.

DETAILED DESCRIPTION

Figure 1:
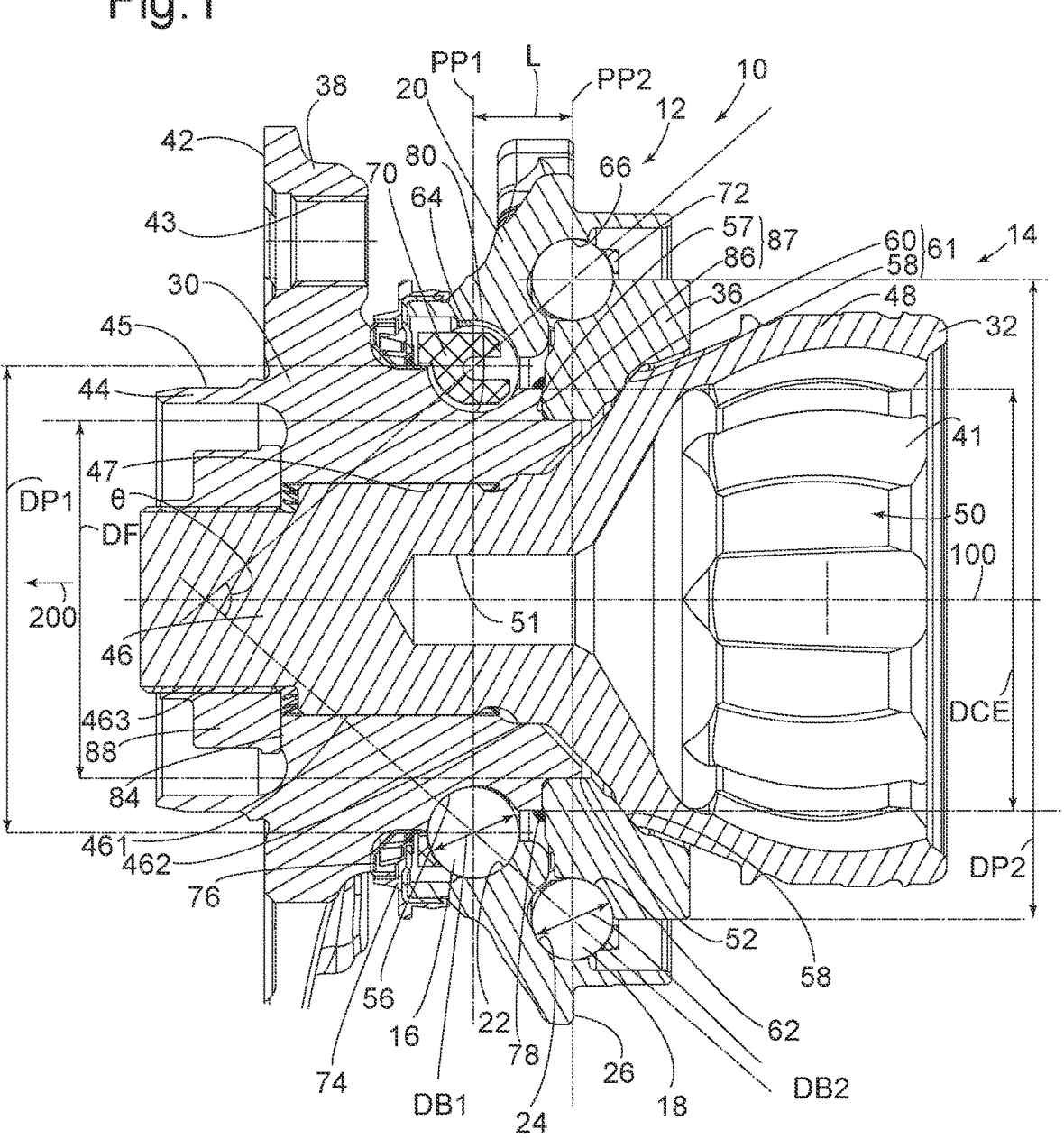
FIG. 1 is a longitudinal sectional view of a motor vehicle drive wheel assembly according to a first embodiment of the invention.

FIG. 1 shows a motor vehicle drive wheel assembly 10, comprising a fixed subassembly 12, intended to be secured to a suspension member of a motor vehicle (not shown) and defining an axis of rotation 100, a rotating subassembly 14, capable of rotating about the axis of rotation 100 inside the fixed subassembly 12, and guiding balls 16, 18 between the rotating subassembly 14 and the fixed subassembly 12.

The fixed subassembly 12 here is constituted by a one-piece solid metal outer ring 20 on which a first outer raceway 22 and a second outer raceway 24, coaxial, are formed that define the axis of rotation 100. The outer ring further comprises at least one attachment clamp 26 extending radially outward, wherein bores (not shown in this figure) are formed for attaching the attachment clamp 26 to a suspension member, via attachment elements (not shown).

The rotating subassembly 14 comprises a wheel hub 30, a transmission bowl 32, and an inner rolling bearing ring 36.

The wheel hub 30 is preferably a solid single-piece metal part, which comprises a flange 38 for attaching a drive wheel rim and a brake disc. The flange 38 has a face 42 bearing the brake disc, and is provided with attachment bores 43, allowing the insertion of attachment elements of the rim and of the brake disc.

The wheel hub 30 also has a centering skirt 44 that projects axially with respect to the flat bearing face 42, in a direction 200 of disassembly of the wheel rim and of the brake disc, and has a centering bearing 45, preferably stepped, facing radially outward, comprising a first cylindrical portion for centering the wheel rim and a second cylindrical portion, of equal or greater diameter, for centering the brake disc during assembly. The centering bearing 45 is not necessarily intended to remain in contact with the rim and the brake disc after assembly.

The transmission bowl 32 is a solid one-piece metal part, which has a solid protruding end portion 46 and a flared middle portion 48 delimiting a cavity 50 of constant velocity joint.

In this embodiment, the cavity 50 comprises rolling tracks 41 located opposite complementary rolling tracks formed on a transmission joint nut (not shown), to guide rolling bodies (not shown) along concave trajectories, for example in an arc of a circle, each located in a plane containing the axis of rotation 100. In a known way, this assembly forms a transmission joint that allows the transmission of a movement and a torque between the nut, secured to a transmission shaft, and the transmission bowl 32, secured to the wheel hub 30, whereas in operation, the transmission shaft does not remain perfectly aligned with the axis of rotation 100 imposed by the outer ring 20, having recalled that the latter is supported by a suspension element ensuring one or more degrees freedom of movement of the outer ring 20 relative to the vehicle body.

The protruding portion 46 of the transmission bowl 32 comprises a splined part 461 mounted free, fitted or shrink-fitted in a splined tubular cavity 47 of the wheel hub 30, forming a splined contact interface. Between this splined part 461 and the flared median portion 48, the protruding portion 46 form a cylindrical bearing surface 462 mounted fitted or with an uncertain clearance in a cylindrical bore 49 of the wheel hub 30.

Furthermore, FIG. 1 shows means for attaching the transmission bowl 32 and the wheel hub 30, which implement a nut 88 screwed to a threaded end 463 of the protruding portion 46 and bearing against the end shoulder 84 of the wheel hub 30.

Where appropriate, the cavity 50 of the transmission bowl 32 may be extended by an optional bore 51 extending in the protruding portion 46, intended to lighten the assembly and to reduce the axial stiffness of the protruding portion 46, in particular to better maintain the tightening tension of the nut 88 over time.

A first inner raceway 56 is formed on the first inner rolling bearing ring 30 facing the first outer raceway 22.

The inner rolling bearing ring 36 is shrink-fitted to a cylindrical shrink-fit surface 52 of the wheel hub 30, with a flat end transverse face 57 bearing axially against a shoulder 86, also flat, of the wheel hub 30, forming a bearing interface 87. Opposite this transverse end face 57, the bearing ring has an annular transverse abutment face 58 axially opposite the first inner raceway 56, and axially protruding relative to the wheel hub 30, so as to bear against a shoulder 60 formed on the transmission bowl 32, forming a contact interface 61. In this embodiment, the annular transverse abutment face 58 and the shoulder 60 are frustoconical, but alternatively, they may be flat. A second inner raceway 62 is formed on the inner rolling bearing ring 36 opposite the second outer raceway 24. The balls 16, 18 form, on the one hand, a first row of balls 16 that roll on the first outer raceway 22 and the first inner raceway 56 and, on the other hand, a second row of balls 18 that roll on the second outer raceway 24 and the second inner raceway 62. A first bearing cage 70 ensures the guiding of the balls 16 of the first row of balls 16 and a second bearing cage 72 ensures the guiding of the balls 18 of the second row of balls 18. In a known manner, the bearing cages delimit cells to house the balls 16, 18 and avoid any direct contact between adjacent balls of the same row. A seal 74 is shrink-fitted on the outer ring 20 of the fixed subassembly 12 and comes into sliding contact with a joint seat 76 shrink-fitted on wheel hub 30. A fillet of sealing paste or a static seal 78 may optionally be positioned bearing on the wheel hub 30 and on the inner rolling bearing ring 36 at the outer perimeter of the interface between the shoulder 86 and the bearing face 57.

For the rest of the description, we will focus on certain remarkable dimensional characteristics of the assembly, illustrated in FIG. 1, which require some preliminary definitions. Thus, we denote:

PP1, the pitch plane where the pitch circle is located constituting the trajectory of the centers of the balls 16 of the first row of balls (also known hereafter as the first pitch plane);

PP2, the pitch plane where the pitch circle is located constituting the trajectory of the centers of the balls 18 of the first row of balls (also known hereafter as the second pitch plane);

L, the distance between the first pitch plane PP1 and the second pitch plane P2.

DP1, the diameter of the pitch circle passing through the centers of the balls 16 of the first row of balls 16;

DP2, the diameter of the pitch circle passing through the centers of the balls 18 of the second row of balls 18;

DB1, the diameter of the balls 16 constituting the balls of the first row of balls;

DB2, the diameter of the balls 18 constituting the balls of the second row of balls;

DCE, the diameter of the outer circumference of the bearing interface between the transverse end face 57 and the shoulder 86. In practice, this diameter is equal to either the outside diameter of the transverse end face 57 or that of the shoulder 86, whichever outside diameter is smaller.

DF, the diameter of the shrink-fit surface 52, at the inner rolling bearing ring 36.

The outer raceways 22, 24 formed on the outer rolling bearing ring 20 are enveloping in the axial direction, in the sense that they each have a raceway bottom 64, 66, located in an intermediate position between the axial ends of the corresponding raceway 22, 24. The balls 16 of the first row of balls 16 are preferably larger than the balls 18 of the second row of balls 18, and the raceways 22, 24, 56, 62 are arranged so as to constitute a rolling bearing with two rows of oblique contact balls of the so-called "O" type. In other words, the points of contact between the balls 16 of the first row and the associated raceways 22, 56 are located on a first contact cone having a first vertex located, with respect to the first row of balls 16, opposite the second row of balls 18, while the points of contact between the balls of the second row 18 and the associated raceways 24, 62 are located on a second contact cone having a second vertex located, relative to the second row of balls 18, opposite the first row of balls 16.

It is also possible to observe the cone containing the pitch circle of the first row of balls 16 and the pitch circle of the second row of balls, the opening angle of which $\theta$ is characterized by the ratio:

$$ tg\left(\frac{\theta}{2}\right) = \frac{DP2 - DP1}{2L} $$

In practice, the opening angle $\theta$ is between 60° and 120°, which is expressed by:

$$ \frac{\sqrt{3}}{3} \leq \frac{DP2 - DP1}{2L} \leq \sqrt{3} $$

In this case, the opening angle $\theta$ is preferably less than or equal to 90°, for good radial compactness of the assembly 10, which is expressed by:

$$ \frac{DP2 - DP1}{2} \leq L $$

Additionally, the two pitch plans PP1 and P2 are close to each other for good axial compactness, though without observing an axial overlap between the two rows of balls 16, 18 projecting onto a plane containing the axis of rotation 100 (for example the plane of FIG. 1), which is translated by the following double inequality:

$$ \frac{DB1 + DB2}{2} \leq L \leq \frac{7}{5} \times \frac{DB1 + DB2}{2} $$

Preferably, an overlap of the rows of balls 16, 18 projecting in a plane perpendicular to the axis of rotation (for example the first pitch plane PP1) is also avoided, which results in the following inequality:

$$ DP1 + DB1 < DP2 - DB2 $$

To avoid the appearance of structural weakness, a sufficient thickness of material is ensured under the outer raceway of the first row 66 by the following inequality:

$$ \sqrt{4 \cdot * L^2 + (DP2 - DP1)^2} - (DB1 + DB2) \geq \frac{2. * DB1}{3} $$

In remarkable manner, the end face 57 of the inner rolling bearing ring 36 is located axially between the first pitch plane PP1 and the second pitch plane P2, at a distance from the first pitch plane PP1 greater than half of the ball diameter DB1 of the balls 16 of the first row of balls 16, which makes it possible to limit the risk of migration of pollutants resulting from contact corrosion between the end face 57 and the shoulder 86. Preferably, the end face 57 is closer to the second pitch plane P2 that the first pitch plane PP1. Preferably, the end face 57 is located a distance from the second pitch plane P2 less than half of the ball diameter DB2 of the balls 18 of the second row of balls 18.

Furthermore, the outer circumference of the bearing interface 87 between the end face 57 and the shoulder 86 is further from the axis of rotation 100 than the raceway bottom 80 of the first inner raceway 56. This separation in the radial direction ensures a sufficiently large bearing interface 87, so as to reduce the pressure at the bearing interface 87 and thus limiting contact corrosion, while maintaining a sufficiently large section of material under the shrink-fitting diameter DF of the inner ring 36, and consequently guarantee good structural strength of the hub 30. In practice, the following inequality is satisfied:

$$DP1 - \frac{6}{10} \cdot * DB1 < DCE$$

or $$DP1 - \frac{8}{10} \cdot * DB1 < DCE$$

To allow easy mounting of the first row of balls 16, the outer circumference DCE of the bearing interface 87 between the end face 57 and the shoulder 86 should preferably remain less than the pitch diameter DP1 of the first row of balls 16, which is reflected in the inequality:

$$DCE < DP1$$

More generally, to guarantee a high bending stiffness to the inner rolling bearing ring 36, it is preferably provided that in orthogonal projection on a plane perpendicular to the axis of rotation 100, for example in orthogonal projection on the plane PP1, there is no overlap between the second row of balls 18 and the bearing interface between the end face 57 and the shoulder 86, which results in the inequality:

$$DCE < DP2 - DB2$$

Preferably:

$$DCE < DP2 - 2 * DB2$$

The positioning of the contact interface 61 of the inner rolling bearing ring 36 with the transmission bowl 32 relative to the bearing interface 87 of the inner rolling bearing ring 36 with the shoulder 86 of the wheel hub 30 and with respect to the inner rolling bearing ring 62 of the inner rolling bearing ring 36 is chosen with as much care as possible, to make the stresses in the inner rolling bearing ring 36 uniform.

To this end, the annular contact interface 61 between the inner rolling bearing ring 36 and the transmission bowl 32 is preferably located at least partially, and preferably entirely, on one side of the second pitch plane P2 opposite the first pitch plane PP1. In orthogonal projection on a plane containing the axis of rotation 100, another part of the annular contact interface 61 between the inner rolling bearing ring 36 and the transmission bowl 32 is preferably positioned at a distance from the bearing interface between the inner rolling bearing ring 36 and the shoulder 86, which is greater than the ball diameter Db2 of the balls of the second row of balls 18. Finally, at least part of the annular contact interface 61 between the inner rolling bearing ring 36 and the transmission bowl 32 is preferably located at a distance from the second pitch plane PP2 greater than half, and preferably greater than two-thirds, of the ball diameter DB2 of the balls of the second row of balls 18.

Furthermore, observed in orthogonal projection on the first pitch plane PP1, at least a portion of the annular contact interface 61 between the inner rolling bearing ring 36 and the transmission bowl 32 is preferably superimposed with at least part of the bearing interface 87 between the end face 57 of the inner rolling bearing ring 36 and the shoulder 86. Again, observed in orthogonal projection on the first pitch plane PP1, at least a portion of the annular contact interface 61 between the inner rolling bearing ring 36 and the transmission bowl 32 is preferably located between the second inner rolling bearing ring 62 of the bearing interface 87 between the end face 57 of the inner rolling bearing ring 36 and the shoulder 86. Finally, seen in orthogonal projection on the first pitch plane P2, the second inner raceway 62 and the annular contact interface 61 between the inner rolling bearing ring 36 and the transmission bowl 32 do not intersect.

The cylindrical bearing surface 462 of the protruding portion 46 of the transmission bowl 32 and the cylindrical bore 49 corresponding to the wheel hub 30 are located at least partially between the first pitch plane PP1 and the second pitch plane P2, and preferably have an intersection with a plane perpendicular to the axis of rotation 100 and tangent to the shoulder 86. With this positioning, the cylindrical bearing surface 462 may participate in limiting the deformations of the wheel hub 30 at the shrink-fit surface 52.

Most of the radial forces applied to the inner rolling bearing ring 36 are transferred to the shrink-fit surface 52 of the wheel hub 30, which preferably at least partially extends between the first pitch plane PP1 and the second pitch plane P2. If appropriate, the shrink-fit surface 52 of the wheel hub 30 extends partially from one side of the second pitch plane PP2 opposite the first pitch plan PP1. Preferably, the shrink-fit surface 52 of the wheel hub 30 is closer to the axis of rotation 100 than the first inner raceway 56, which results in the following inequality:

$$DP1 - \frac{6}{5}DB1 < DF < DP1 - \frac{10}{14} \cdot * DB1$$

Preferably:

$$DP1 - \frac{6}{5}DB1 < DF < DP1 - DB1$$

Figure 2:
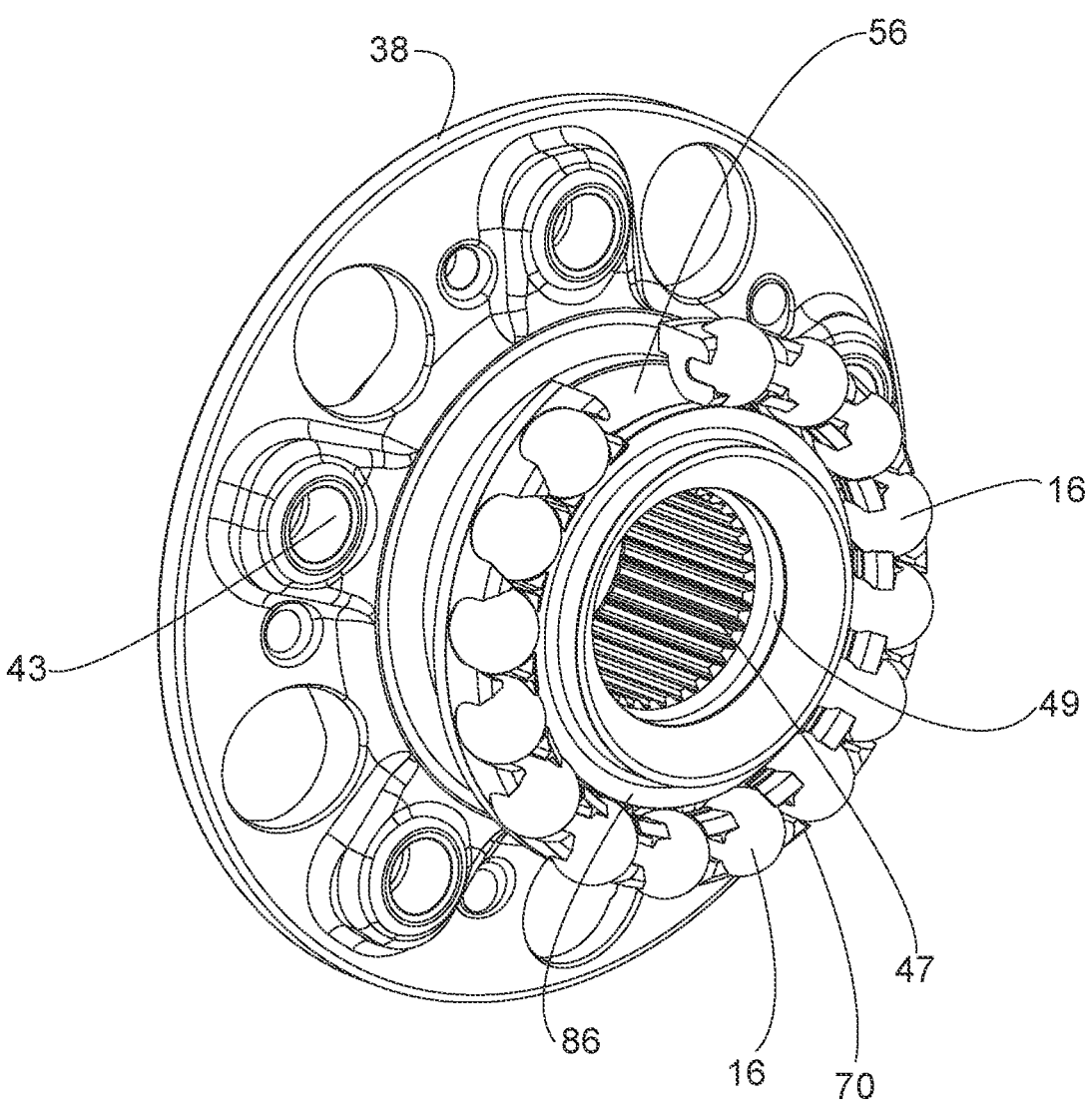
FIG. 2 shows a step of mounting an assembly according to FIG. 1.

In remarkable manner, the first bearing cage 70 is an open ring, as shown in FIG. 2, and is elastically deformable, to allow it to pass by the shoulder 86. During the mounting of the assembly 10, the bearing cage 70 is positioned facing the first inner raceway 56 by expanding the bearing cage 70 as it passes through the shoulder 86 of the movable subassembly as shown in FIG. 2, and the balls 16 of the first row of balls 16 are positioned in cells of the bearing cage 70, either before positioning of the bearing cage 70, or after positioning the bearing cage 70, all before assembling the one-piece outer ring 20, and before shrink-fitting the inner rolling bearing ring 36 on the wheel hub 30.

Naturally, the examples shown in the figures and discussed above are provided for illustrative and non-limiting purposes only.

Figure 3:
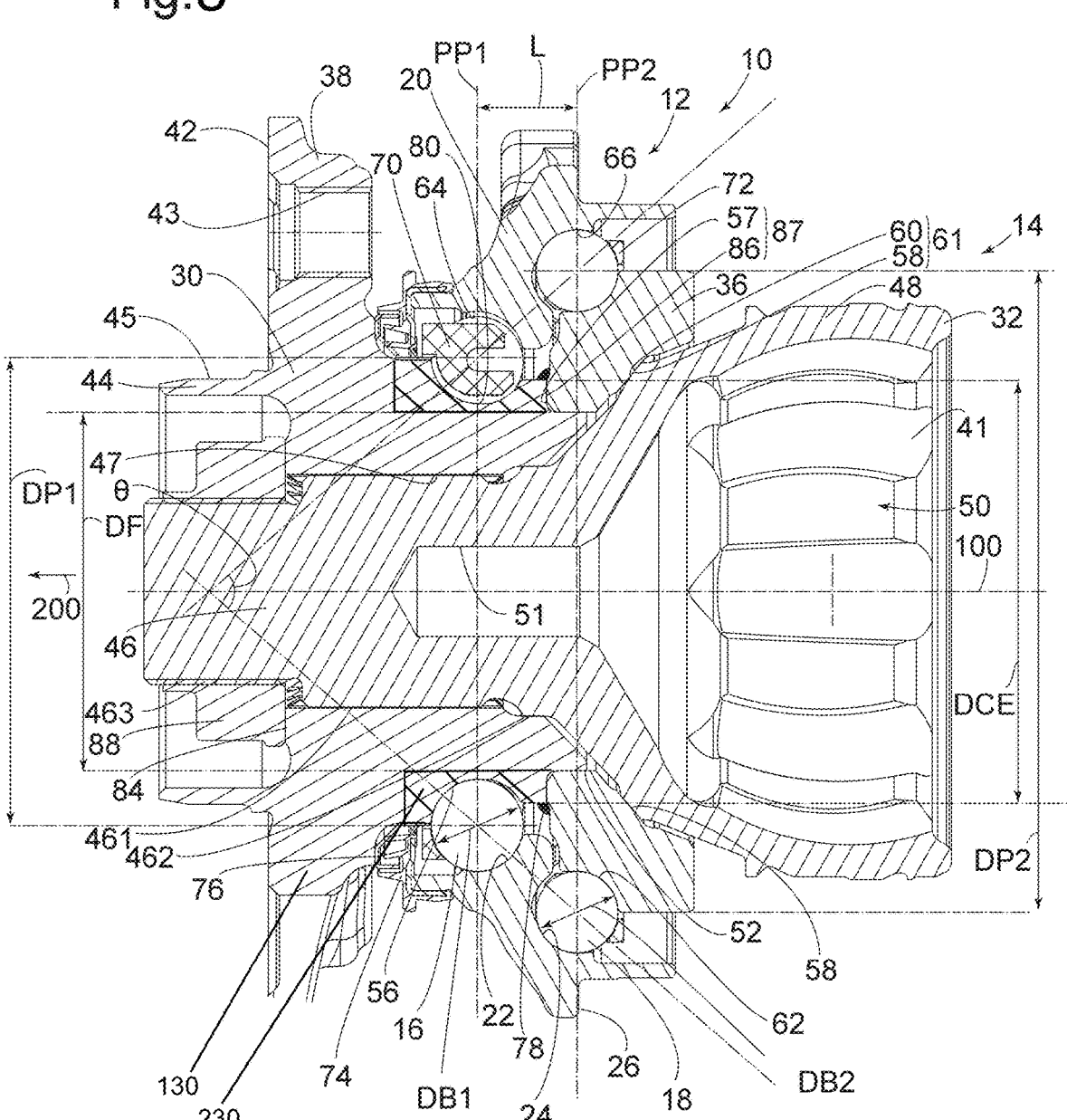
FIG. 3 is a longitudinal sectional view of a motor vehicle drive wheel assembly according to a second embodiment of the invention.

In one variant of the first embodiment, illustrated in FIG. 3, the wheel hub 30 can be at least two parts, with a solid one-piece part 130 forming the flange 38 and the shrink-fit surface 52, and an additional inner rolling bearing ring 230 shrink-fitted on the solid part, which forms the first inner raceway 56 and the shoulder 86.

In another variant, the balls 16, 18 of two rows of balls may have the same diameter, and one or both rows can receive conical rollers instead of the balls.

As a variant, it is possible to provide a fixed subassembly in several parts, with a clamp 26 fastening to a suspension element of the vehicle, and two coaxial outer rolling bearing rings shrink-fitted in this clamp.

The transmission joint may be a constant-velocity joint of any suitable type, in particular a Rzeppa constant-velocity joint controlled by the rolling tracks 41, but other variants of constant-velocity joints are possible, for example Rzeppa joints controlled by the joint cage, or cross-track joints. Thus, the rolling tracks 41 are not necessarily circular, or even necessarily concave, straight tracks also being possible.

Throughout the text of the present application, "fixed subassembly" has been used to refer to a subassembly that constitutes a fixed coordinate system for the rotation of the movable subassembly. Those skilled in the art will have understood that this subassembly is itself required to move relative to the body of the vehicle, depending on the geometry of the suspension interposed between the body of the vehicle and the fixed subassembly.

The invention claimed is:

1. A motor vehicle drive wheel assembly, comprising:

a fixed sub-assembly comprising a first annular outer raceway and a second annular outer raceway centered on an axis of rotation;

a rotating subassembly, capable of rotating relative to the fixed subassembly about the axis of rotation, and comprising a wheel hub comprising a flange provided with an interface for attaching a wheel rim or a brake disc, the attachment flange forming a mounting face of the wheel rim or of the brake disc axially facing in a direction of disassembly of the wheel rim or of the brake disc, the direction of disassembly being parallel to the axis of rotation, a transmission bowl, and at least one inner rolling bearing ring, the at least one inner rolling bearing ring being shrink-fitted onto a shrink-fit surface of the wheel hub, the at least one inner rolling bearing ring having a contact face facing axially in the opposite direction to the direction of disassembly, bearing against the transmission bowl at an annular contact interface, the at least one inner rolling bearing ring having an end face facing axially in the direction of disassembly, bearing against a shoulder of the wheel hub along a bearing interface having an outer circumference with a diameter DCE, the rotating subassembly further comprising a first inner raceway located opposite the first outer raceway and a second inner raceway located opposite the second outer raceway and formed on the at least one inner rolling bearing ring; and balls, forming a first row of balls having a ball diameter DB1 and capable of rolling on the first outer raceway and the first inner raceway and a second row of balls having a ball diameter DB2 and capable of rolling on the second outer raceway and the second inner raceway, the centers of the balls of the first row of balls being located on a pitch circle of diameter DP1 located in a first pitch plane, the centers of the balls of the second row of balls being located on a pitch circle of diameter DP2 located in a second pitch plane, the first pitch plane being located at a non-zero distance L from the second pitch plane in the direction of disassembly, the end face being located axially between the first pitch plane and the second pitch plane;

wherein the end face of the at least one inner rolling bearing ring is located at a distance from the first pitch plane greater than half of the ball diameter DB1 of the balls of the first row of balls and in that the relationship:

$$DP1 - \frac{8}{10}DB1 < DCE$$

is satisfied.

2. The drive wheel assembly of claim 1, wherein the relationship:

$$DCE < DP2 - 2.DB2$$

is satisfied.

3. The drive wheel assembly of claim 2, wherein the relationship is satisfied $$DCE < DP1$$

4. The drive wheel assembly of claim 1, wherein:

the end face of the at least one inner rolling bearing ring is closer to the second pitch plane than the first pitch plane; and/or the end face of the at least one inner rolling bearing ring is located at a distance from the second pitch plane less than half of the ball diameter DB2 of the balls of the second row of balls.

5. The drive wheel assembly of claim 1, wherein one or more of the following relationships are satisfied:

$$L \geq \frac{DP2 - DP1}{2}$$

and/or $$L \leq \frac{7}{5} \times \frac{DB1 + DB2}{2}$$

and/or $$\sqrt{4*L^2 + (DP2 - DP1)^2} - (DB1 + DB2) \geq \frac{2}{3} \times DB1$$

6. The drive wheel assembly of claim 1, wherein the relationship:

$$\frac{DB1 + DB2}{2} \leq L$$

is satisfied.

7. The drive wheel assembly of claim 1, wherein:

the annular contact interface between the first inner raceway or the second inner raceway and the transmission bowl is located at least partially on one side of the second pitch plane opposite the first pitch plane; and/or the annular contact interface between the first inner raceway or the second inner raceway and the transmission bowl is located entirely on one side of the second pitch plane opposite the first pitch plane; and/or at least part of the annular contact interface between the at least one inner rolling bearing ring and the transmission bowl is located a distance from the second pitch plane greater than half of the ball diameter DB2 of the balls of the second row of balls; and/or in orthogonal projection on the first pitch plane, at least part of the annular contact interface between the at least one inner rolling bearing ring and the transmission bowl is superimposed with at least part of the bearing interface between the end face of the at least one inner rolling bearing ring and the shoulder; and/or in orthogonal projection on the first pitch plane, at least part of the annular contact interface between the at least one inner rolling bearing ring and the transmission bowl is located between the second inner raceway and the outer circumference of the bearing interface between the end face of the at least one inner rolling bearing ring and the shoulder; and/or in orthogonal projection on the first pitch plane, the annular contact interface between the at least one inner rolling bearing ring and the transmission bowl and the second inner raceway are spaced apart from one another; and/or in orthogonal projection on the first pitch plane, the annular contact interface between the at least one inner rolling bearing ring and the transmission bowl and the second inner raceway are at a distance from each other greater than half of the ball diameter DB2.

8. The drive wheel assembly of claim 1, wherein the transmission bowl has a cylindrical bearing surface transition fitted into a cylindrical bore of the wheel hub and located at least partially between the first pitch plane and the second pitch plane.

9. The drive wheel assembly of claim 8, wherein the cylindrical bearing surface of the transmission bowl has an intersection with a plane perpendicular to the axis of rotation and tangent to the shoulder.

10. The drive wheel assembly of claim 1, wherein:

the shrink-fit surface of the wheel hub extends at least partially between the first pitch plane and the second pitch plane; and/or the shrink-fit surface of the wheel hub extends partially from one side of the second pitch plane opposite the first pitch plane; and/or the shrink-fit surface of the wheel hub has a diameter DF such that the following relationship is satisfied:

$$DF < DP1 - \frac{10}{14} \cdot DB1$$

and/or the shrink-fit surface of the wheel hub has a diameter DF such that the following relationship is satisfied:

$$DP1 - \frac{6}{5} DB1 < DF$$

11. The drive wheel assembly of claim 1, wherein the bearing interface between a bearing face and the shoulder is flat.

12. The drive wheel assembly of claim 1, wherein:

the wheel hub is a solid one-piece part; or the wheel hub comprises at least one solid one-piece part forming the flange and the shrink-fit surface, and an additional inner rolling bearing ring shrink-fitted onto the solid part, which forms the first inner raceway and the shoulder.

13. The drive wheel assembly of claim 1, wherein the first inner raceway faces the first row of balls in an axial direction, in the direction of disassembly and in a direction opposed to the direction of disassembly.

14. The drive wheel assembly of claim 1, wherein the relationship DB1>DB2 is satisfied.

15. The drive wheel assembly of claim 1, wherein the first row of balls is guided in rotation by a cage constituting an elastically deformable open ring.

16. A method of mounting a drive wheel assembly of claim 1, further comprising:

a step of positioning a bearing cage constituting an open, elastically deformable ring, facing the first inner raceway, by expanding the bearing cage when passing the shoulder, a subsequent step of shrink-fitting the inner rolling bearing ring on the wheel hub, and a step of positioning the balls of the first row of balls in cells of the bearing cage, either before or after the step of positioning the bearing cage.

17. The drive wheel assembly of claim 1, wherein the relationship is satisfied $$DP1 - \frac{6}{10} \cdot DB1 < DCE$$

18. The drive wheel assembly of claim 1, wherein in orthogonal projection on the axis of rotation, at least part of the annular contact interface between the inner rolling bearing ring and the transmission bowl is positioned at a distance from the bearing interface between the inner rolling bearing ring and the shoulder, which is less than the ball diameter DB2 of the balls of the second row of balls.

19. The drive wheel assembly of claim 1, wherein in orthogonal projection on the axis of rotation, at least part of the annular contact interface between the inner rolling bearing ring and the transmission bowl is positioned at a distance from the bearing interface between the inner rolling bearing ring and the shoulder, which is greater than the ball diameter DB2 of the balls of the second row of balls.

\* \* \* \* \*